(12) United States Patent
Hagshenas et al.

(10) Patent No.: US 7,736,062 B2
(45) Date of Patent: Jun. 15, 2010

(54) AUXILIARY ROTARY BEARING SYSTEM

(75) Inventors: Behzad Hagshenas, San Diego, CA (US); Charles B. Parme, San Diego, CA (US); Dirk A. Fichtner, San Diego, CA (US); Crosby H. Johnson, San Diego, CA (US); Dominic Giammaria, Oceanside, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 488 days.

(21) Appl. No.: 11/901,034

(22) Filed: Sep. 14, 2007

(65) Prior Publication Data

US 2009/0074338 A1  Mar. 19, 2009

(51) Int. Cl.
 *F16C 35/06* (2006.01)
 *F16C 32/04* (2006.01)
 *F16C 41/00* (2006.01)

(52) U.S. Cl. ............ 384/428; 384/448; 384/605; 384/624

(58) Field of Classification Search .......... 384/102, 384/257, 446, 543, 551, 609, 624, 448, 605; 310/62, 90.5; 415/11, 90, 229–230
See application file for complete search history.

(56) References Cited

U.S. PATENT DOCUMENTS

| | | | | |
|---|---|---|---|---|
| 4,641,978 A | * | 2/1987 | Kapich | 384/102 |
| 4,683,111 A | * | 7/1987 | Helm et al. | 384/446 |
| 5,588,754 A | * | 12/1996 | Miller | 384/609 |
| 5,747,907 A | * | 5/1998 | Miller | 310/90 |
| 5,833,374 A | * | 11/1998 | Casaro | 384/543 |
| 5,867,979 A | * | 2/1999 | Newton et al. | 310/90.5 |
| 6,074,165 A | * | 6/2000 | Casaro et al. | 384/101 |
| 6,078,120 A | * | 6/2000 | Casaro et al. | 310/90.5 |
| 6,566,775 B1 | * | 5/2003 | Fradella | 310/90.5 |
| 6,570,286 B1 | * | 5/2003 | Gabrys | 310/90.5 |
| 6,608,418 B2 | * | 8/2003 | Andres et al. | 310/90.5 |
| 6,664,680 B1 | * | 12/2003 | Gabrys | 310/90.5 |
| 6,777,841 B2 | * | 8/2004 | Steinmeyer | 310/90.5 |
| 6,794,777 B1 | * | 9/2004 | Fradella | 310/90.5 |
| 6,897,587 B1 | * | 5/2005 | McMullen et al. | 310/90.5 |

FOREIGN PATENT DOCUMENTS

| | | | |
|---|---|---|---|
| JP | 06200937 A | * | 7/1994 |
| JP | 10184580 A | * | 7/1998 |
| WO | WO 9946508 A2 | * | 9/1999 |

* cited by examiner

*Primary Examiner*—Marcus Charles
(74) *Attorney, Agent, or Firm*—Stephen G. Mican

(57) ABSTRACT

For machinery comprising rotary components attached to at least one drive shaft, at least one rotary bearing to position the drive shaft with a rotational freedom of movement about a drive shaft axis and associated stationary components, apparatus that comprises: a rotary backup bearing sleeve attached to the drive shaft proximate the bearing comprising a rotary radial surface relative to the drive shaft axis and a rotary axial surface relative to the drive shaft axis; and a stationary backup bearing collar mounted to one of the stationary components proximate the rotary backup bearing sleeve comprising a stationary radial surface relative to the drive shaft axis proximate the rotary radial surface with a predetermined axial clearance and a stationary axial surface relative to the drive shaft axis proximate the rotary radial surface with a predetermined axial clearance.

20 Claims, 2 Drawing Sheets

AUXILIARY ROTARY BEARING SYSTEM

FIELD OF THE INVENTION

The invention relates to a bearing system for rotary machinery, and more particularly to a rotary bearing system that has fail-safe functionality.

BACKGROUND OF THE INVENTION

Rotating equipment is used in many relatively service-free applications, such as electric motors for fans, blowers and pumps. Although relatively service-free, bearings for such rotating machinery have a limited service life. Particularly in the case of such rotating machinery subject to unfavourable environments, such as those with ambient contamination or temperature extremes, and such machinery that employs sealed bearings, the service life of these bearings may at times be less than predicted. In such instances, the bearings may be subject to catastrophic failure whilst in service. Such failure may cause damage to the machinery and adversely affect ambient conditions, such as due to sparks, smoke, heat and odour.

SUMMARY OF THE INVENTION

For machinery comprising rotary components attached to at least one drive shaft, at least one rotary bearing to position the drive shaft with a rotational freedom of movement about a drive shaft axis and associated stationary components with at least one predetermined clearance from the rotary components, the invention generally comprises apparatus for preventing the rotary components from contacting the stationary components upon failure of the bearing, comprising: a rotary backup bearing sleeve attached to the drive shaft proximate the bearing comprising a rotary radial surface relative to the drive shaft axis and a rotary axial surface relative to the drive shaft axis; and a stationary backup bearing collar mounted proximate the rotary backup bearing sleeve comprising a stationary radial surface relative to the drive shaft axis proximate the rotary radial surface with a predetermined axial clearance and a stationary axial surface relative to the drive shaft axis proximate the rotary radial surface with a predetermined axial clearance; wherein the rotary backup bearing sleeve contacts the stationary backup bearing collar upon failure of the bearing and the predetermined axial and radial clearances limit deviation of the rotary components to less than the predetermined clearance from the stationary components.

DETAILED DESCRIPTION OF THE INVENTION

Figure 1:
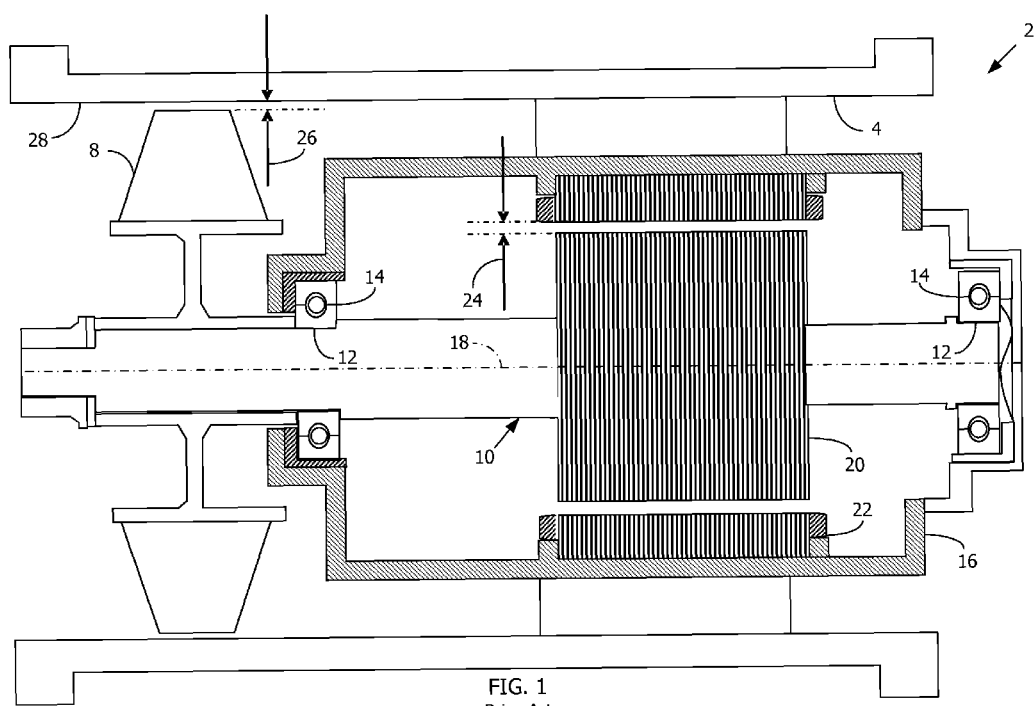
FIG. 1 is cut-away side view of an apparatus comprising rotating machinery according to the prior art.

FIG. 1 is a cut-away side view of an apparatus comprising rotary machinery according to the prior art. By way of example only, the apparatus in FIG. 1 comprises an electrically powered axial fan. The fan 2 has an outer housing 4 that supports and encloses rotary machinery that comprises an electrical motor 6 coupled to an axial fan blade 8 by means of a drive shaft 10. The drive shaft 10 has two rotary support surfaces that comprise shaft journals 12. Each shaft journal 12 has an associated rotary bearing comprising a shaft bearing 14 that mounts to a motor housing 16 for the motor 6. The bearings 14 position and align the drive shaft 10 within the motor 6 with a rotational freedom of movement along shaft axis of rotation 18. The electrical motor 6 also comprises a rotor 20 and a stator 22. The drive shaft 10 mounts the rotor 20 and the motor housing 16 mounts the stator 22 to at least partially circumscribe the rotor 20 with a predetermined stator clearance 24. The fan blade 8 has a predetermined wall clearance 26 from an inner wall 28 of the outer housing 4.

Should one or both shaft bearings 14 fail whilst the fan 2 is in service, the drive shaft 10 may continue to rotate. In this case, the drive shaft 10 may no longer rotate about its normal axis of rotation 18, and instead it may wobble or drift off of the axis 18 to such an extent that the rotor 20 drifts more than the predetermined stator clearance 24 and rubs against the stator 22, the fan blade 8 drifts more than the predetermined wall clearance 26 and rubs against the inner wall 28 of the outer housing 4, or both. This condition may cause damage to any one of these components, as well as adversely affect ambient conditions, such as due to sparks, smoke, heat and odour.

Figure 2:
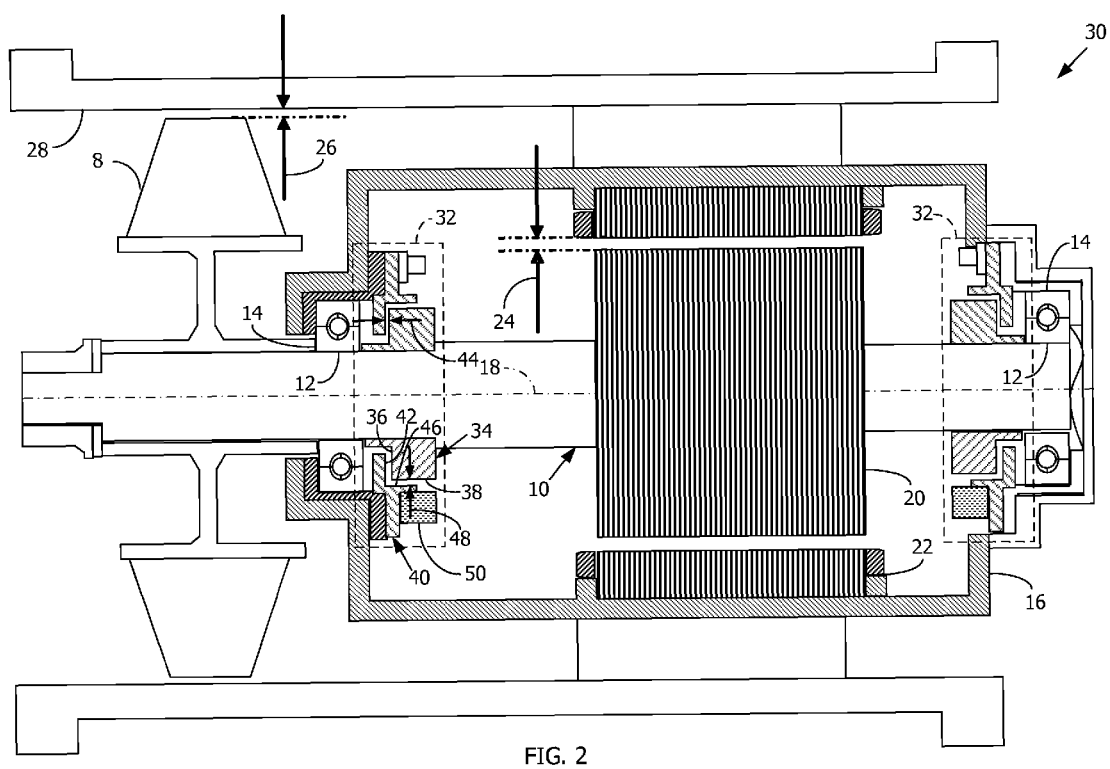
FIG. 2 is a cut-away side view of an apparatus comprising rotating machinery according to a possible embodiment of the invention.

FIG. 2 is a cut-away side view of an apparatus comprising rotating machinery according to a possible embodiment of the invention. By way of example only, the apparatus in FIG. 2 comprises an electrically powered axial fan 30 similar to the hereinbefore described fan 2 in general operation. However, at least one, and preferably each, bearing 14 has an associated backup bearing assembly 32 that functions upon a failure of its associated bearing 14. Each backup bearing assembly 32 comprises a backup rotary bearing surface comprising a backup bearing sleeve 34 mounted on the drive shaft 10 adjacent its associated bearing 14. Each backup bearing sleeve 34 has a radial sleeve surface 36 and an axial sleeve surface 38. Each backup bearing assembly 32 also comprises a backup stationary bearing surface comprising a backup bearing collar 40. Each backup bearing collar 40 has a radial collar surface 42 generally parallel to the radial sleeve surface 36 of its associated backup bearing sleeve 34 spaced by a predetermined axial clearance 44. Each backup bearing collar 40 also has an axial collar surface 46 that generally circumscribes the axial sleeve surface 38 of its associated backup bearing sleeve 34 spaced by a predetermined radial clearance 48.

Upon the occurrence of excessive wear or failure of one of the bearings 14, the backup sleeve 34 may start to make contact with the backup bearing collar 40 in its associated backup bearing assembly 32. The predetermined axial clearance 44 and the predetermined radial clearance 48 have values such that when the backup bearing sleeve 34 makes contact with the backup bearing collar 40 the backup bearing assembly 32 limits deviation of the fan blade 8 to less than its predetermined wall clearance 26 and likewise limits radial deviation of the rotor 20 to less than its predetermined stator clearance 24.

The contact surfaces of the backup bearing sleeve 34 and the backup bearing collar in each backup bearing 32 preferably comprise a high-temperature material that offers a moderate degree of friction. Using a high-temperature material prevents contamination of ambient conditions, such as by sparks, smoke, heat and odour. Using a material that offers a moderate degree of friction is useful to induce a motor overload condition that may conveniently trigger motor shutdown. Alternatively, such friction may induce sufficient heat in the backup bearing assembly 32 to trigger an associated bearing failure sensor 50.

The bearing failure sensor 50 may comprise any sort of contact-sensitive sensor or component for sensing contact of the backup bearing sleeve 34 and the backup bearing collar 40 that may transmit an electrical sensor signal or interrupt electrical power to the electrical motor 6. For example, the bearing sensor 50 may comprise a speed change-sensitive sensor or component, such as an accelerometer, that responds to speed change due to contact and transmits a sensor signal to a motor controller (not shown) that interrupts electrical power to the electrical motor 6 upon reaching a predetermined change in speed. Alternatively, the sensor 50 may comprise a sensor or component that responds to temperature change and that interrupts electrical power to the electrical motor 6 upon reaching a predetermined temperature. For instance, the sensor 50 may comprise a thermocouple that transmits a temperature signal to a motor controller (not shown) that interrupts electrical power to the electrical motor 6 if the temperature signal exceeds a predetermined value. Alternatively, the sensor 50 may comprise a bimetallic switch or fusible link to interrupt power to the electrical motor 6 if the temperature reaches or exceeds a predetermined value.

Although the apparatus hereinbefore described comprises an electric fan by way of example, the apparatus may be any machinery with rotating components. Likewise, the apparatus may have as little as a single bearing or more than two. It may also have multiple drive shafts, with as little as one bearing for each drive shaft. As little as one, or as many as all, of the bearings may have associated backup bearing assemblies according to the invention. The described embodiment of the invention is only an illustrative implementation of the invention wherein changes and substitutions of the various parts and arrangement thereof are within the scope of the invention as set forth in the attached claims.

The claimed invention is:

1. For machinery comprising rotary components attached to at least one drive shaft, at least one rotary bearing to position the drive shaft with a rotational freedom of movement about a drive shaft axis and associated stationary components with at least one predetermined clearance from the rotary components, apparatus for preventing the rotary components from contacting the stationary components upon failure of the bearing, comprising:
   a rotary backup bearing sleeve attached to the drive shaft proximate the bearing comprising a rotary radial surface relative to the drive shaft axis and a rotary axial surface relative to the drive shaft axis; and
   a stationary backup bearing collar mounted to one of the stationary components proximate the rotary backup bearing sleeve comprising a stationary radial surface relative to the drive shaft axis proximate the rotary radial surface with a predetermined axial clearance and a stationary axial surface relative to the drive shaft axis proximate the rotary radial surface with a predetermined axial clearance;
   wherein the rotary backup bearing sleeve contacts the stationary backup bearing collar upon failure of the bearing and the predetermined axial and radial clearances limit deviation of the rotary components to less than the predetermined clearance from the stationary components.

2. The apparatus of claim 1, wherein the rotary radial surface, the rotary axial surface, the stationary radial surface and the stationary axial surface comprise high-temperature materials.

3. The apparatus of claim 1, wherein the rotary radial surface, the rotary axial surface, the stationary radial surface and the stationary axial surface comprise frictional surfaces.

4. The apparatus of claim 1, further comprising a contact-sensitive component proximate the backup bearing collar for sensing contact of the backup bearing sleeve with the stationary backup bearing collar upon failure of the bearing.

5. The apparatus of claim 4, wherein the contact-sensitive component comprises a speed change-sensitive component that responds to machinery speed change due to backup bearing sleeve and backup bearing collar contact.

6. The apparatus of claim 5, wherein the speed change-sensitive component stops the machinery if the machinery speed change exceeds a predetermined value.

7. The apparatus of claim 4, wherein the contact-sensitive component comprises a temperature-sensitive component that responds to temperature change due to backup bearing sleeve and backup bearing collar contact.

8. The apparatus of claim 7, wherein the temperature-sensitive component comprises a temperature sensor that transmits a signal to stop the machinery upon reaching a predetermined temperature.

9. The apparatus of claim 7, wherein the temperature-sensitive component interrupts electrical power that stops the machinery upon reaching a predetermined temperature.

10. A fan comprising:
    a rotating fan blade;
    an electrical motor with a motor housing, a stator and a rotor coupled to the fan blade by means of a drive shaft;
    at least an outer stationary housing that supports and encloses the fan blade and motor;
    at least one rotary bearing to position the drive shaft with a rotational freedom of movement about a drive shaft axis;
    a rotary backup bearing sleeve attached to the drive shaft proximate the bearing comprising a rotary radial surface relative to the drive shaft axis and a rotary axial surface relative to the drive shaft axis; and
    a stationary backup bearing collar mounted to the motor housing proximate the rotary backup bearing sleeve comprising a stationary radial surface relative to the drive shaft axis proximate the rotary radial surface with a predetermined axial clearance and a stationary axial surface relative to the drive shaft axis proximate the rotary radial surface with a predetermined axial clearance;
    wherein the rotary backup bearing sleeve contacts the stationary backup bearing collar upon failure of the bearing and limits deviation of the fan and the rotor to the predetermined axial and radial clearances.

11. The fan of claim 10, wherein the rotary radial surface, the rotary axial surface, the stationary radial surface and the stationary axial surface comprise frictional surfaces.

12. The fan of claim 10, further comprising a contact-sensitive component proximate the backup bearing collar for sensing contact of the backup bearing sleeve with the stationary backup bearing collar upon failure of the bearing.

13. The fan of claim 12, wherein the contact-sensitive component comprises a speed change-sensitive component that responds to electric motor speed change due to backup bearing sleeve and backup bearing collar contact.

14. The fan of claim 13, wherein the speed change-sensitive component stops the fan if the electric motor speed change exceeds a predetermined value.

15. The fan of claim 12, wherein the contact-sensitive component comprises a temperature-sensitive component that responds to temperature change due to backup bearing sleeve and backup bearing collar contact.

16. The fan of claim 15, wherein the temperature-sensitive component comprises a temperature sensor that transmits a signal to stop the fan upon reaching a predetermined temperature.

17. The fan of claim 15, wherein the temperature-sensitive component interrupts electrical power that stops the fan upon reaching a predetermined temperature.

18. The fan of claim 10, further comprising two bearings that support the drive shaft.

19. The fan of claim 18, wherein each bearing has an associated backup bearing sleeve and backup bearing collar.

20. For machinery comprising rotary components attached to at least one drive shaft, at least one rotary bearing to position the drive shaft with a rotational freedom of movement about a drive shaft axis and associated stationary components with at least one predetermined clearance from the rotary components, a method of preventing the rotary components from contacting the stationary components upon failure of the bearing, comprising the steps of:

forming a rotary backup bearing surface adjacent to the bearing comprising a rotary radial surface relative to the drive shaft axis and a rotary axial surface relative to the drive shaft axis;

forming a stationary backup bearing surface comprising a stationary radial surface relative to the drive shaft axis and a stationary axial surface relative to the drive shaft axis;

attaching the stationary backup bearing surface to one of the stationary components proximate the rotary backup bearing surface;

positioning the stationary radial surface to be proximate the rotary radial surface with a predetermined axial clearance; and positioning the stationary axial radial surface to be proximate the rotary axial surface with a predetermined radial clearance;

wherein the rotary backup bearing surface contacts the stationary backup bearing surface upon failure of the bearing and the predetermined axial and radial clearances limit radial deviation of the rotary components to less than the predetermined clearance from the stationary components.

* * * * *